United States Patent
Batchu et al.

(10) Patent No.: US 11,487,889 B2
(45) Date of Patent: *Nov. 1, 2022

(54) MOBILE DEVICE MANAGEMENT BROKER

(71) Applicant: MOBILE IRON, INC., Mountain View, CA (US)

(72) Inventors: Suresh Kumar Batchu, Milpitas, CA (US); Mansu Kim, San Jose, CA (US)

(73) Assignee: MOBILE IRON, INC., Mountain View, CA (US)

(*) Notice: Subject to any disclaimer, the term of this patent is extended or adjusted under 35 U.S.C. 154(b) by 504 days.

This patent is subject to a terminal disclaimer.

(21) Appl. No.: 16/229,623

(22) Filed: Dec. 21, 2018

(65) Prior Publication Data

US 2019/0188393 A1   Jun. 20, 2019

Related U.S. Application Data

(63) Continuation of application No. 14/675,469, filed on Mar. 31, 2015, now Pat. No. 10,198,585.
(Continued)

(51) Int. Cl.
*G06F 21/60* (2013.01)
*G06F 21/30* (2013.01)
(Continued)

(52) U.S. Cl.
CPC .......... *G06F 21/604* (2013.01); *G06F 21/305* (2013.01); *G06F 21/6218* (2013.01);
(Continued)

(58) Field of Classification Search
CPC .. G06F 21/604; G06F 21/305; G06F 21/6218; G06F 21/88; G06F 2221/2143;
(Continued)

(56) References Cited

U.S. PATENT DOCUMENTS 8,813,179 B1 * 8/2014 Qureshi ................. H04L 63/20
726/1
9,215,148 B2 * 12/2015 Chai ................... G06F 21/6218
(Continued)

FOREIGN PATENT DOCUMENTS

CN   101366036   2/2009
CN   102906758   1/2013
(Continued)

OTHER PUBLICATIONS

OMA, Open Mobile Alliance, "Lightweight Machine to Machine Technical Specification; OMA-TS-LightweightM2M-V1 0-20140115-D_cb", OMA-TS-LIGHTWEIGHTM2M-V1_0-20140115-D_CB, Open Mobile Alliance (OMA), 4330 La Jolla Village Dr., Suite 110 San Diego, CA 92122; USA, No. 1.0; Jan. 15, 2014, pp. 1-104, XP064175915, Retrieved from the Internet: URL:ftp/Public_documents/DM/LightweightM2M/Permanent_documents/ [retrieved on Jan. 16, 2014] Section 7.3.

*Primary Examiner* — Trang T Doan
(74) *Attorney, Agent, or Firm* — Van Pelt, Yi & James LLP

(57) ABSTRACT

Techniques to manage mobile devices are disclosed. In various embodiments, a request to perform a management action with respect to a mobile device is received from a mobile device management (MDM) authority. A scope of authority of the MDM authority with respect to the mobile device is determined. The management action is caused to be performed with respect to the mobile device based at least in part on the determined scope of authority of the MDM authority with respect to the mobile device.

19 Claims, 7 Drawing Sheets

Related U.S. Application Data

(60) Provisional application No. 61/973,083, filed on Mar. 31, 2014.

(51) Int. Cl.
  *G06F 21/62* (2013.01)
  *G06F 21/88* (2013.01)
  *H04W 12/08* (2021.01)
  *H04W 12/37* (2021.01)
  *H04W 4/50* (2018.01)

(52) U.S. Cl.
  CPC ............ *G06F 21/88* (2013.01); *H04W 4/50* (2018.02); *H04W 12/08* (2013.01); *H04W 12/37* (2021.01); *G06F 2221/2143* (2013.01); *G06F 2221/2149* (2013.01)

(58) Field of Classification Search
  CPC . G06F 2221/2149; H04W 4/50; H04W 12/37; H04W 12/08
  See application file for complete search history.

(56) References Cited

U.S. PATENT DOCUMENTS

| | | |
|---|---|---|
| 2002/0171546 A1 | 11/2002 | Evans |
| 2002/0172363 A1 | 11/2002 | Dierks |
| 2005/0181808 A1 | 8/2005 | Vaudreuil |
| 2006/0106917 A1* | 5/2006 | Lambourn .......... G06F 21/6218 710/240 |
| 2010/0275029 A1* | 10/2010 | Little ...................... G06F 21/64 713/176 |
| 2011/0196966 A1* | 8/2011 | Chai ...................... H04L 63/101 709/225 |
| 2011/0313981 A1* | 12/2011 | Ben-Natan .......... G06F 21/6227 707/694 |
| 2012/0150912 A1* | 6/2012 | Ripberger ............. G06F 16/211 707/786 |
| 2013/0017806 A1* | 1/2013 | Sprigg .................... H04M 1/66 455/411 |
| 2014/0038546 A1* | 2/2014 | Neal .................... G06Q 10/103 455/405 |
| 2015/0188777 A1* | 7/2015 | Frost .................... H04W 12/37 709/223 |
| 2015/0207798 A1 | 7/2015 | Nallapa Raju |
| 2015/0222665 A1* | 8/2015 | Eberlein ................. H04L 63/10 726/1 |

FOREIGN PATENT DOCUMENTS

| | | |
|---|---|---|
| EP | 1981210 | 10/2008 |
| WO | 2014038820 | 3/2014 |

\* cited by examiner

| Device | Policy and Setting | Allowed to | Filter |
|---|---|---|---|
| 1234 | Exchange | Enterprise 1 | |
| 1234 | Exchange | Enterprise 2 | |
| 1234 | Apps | Enterprise 1 | Installation, removal, Inventory(installed only) |
| 1234 | Apps | Enterprise 2 | Installation, removal, Inventory(all) |
| 1234 | Traffic Splice | Enterprise 1 | Domain(ent1.com) |
| 1234 | Traffic Splice | Enterprise 2 | IP-Net(210.1.1.0/24) |
| 1234 | device lock down | App Server 1 | camera capture lock |

MOBILE DEVICE MANAGEMENT BROKER

CROSS REFERENCE TO OTHER APPLICATIONS

This application is a continuation of U.S. patent application Ser. No. 14/675,469 entitled MOBILE DEVICE MANAGEMENT BROKER filed Mar. 31, 2015 now U.S. Pat. No. 10,198,585, which is incorporated herein by reference for all purposes, which claims priority to U.S. Provisional Patent Application No. 61/973,083 entitled BYOD MANAGEMENT BROKER filed Mar. 31, 2014 which is incorporated herein by reference for all purposes.

BACKGROUND OF THE INVENTION

Employees increasingly may use personal devices (e.g., mobile phone, tablet, laptop, etc.) for work purposes, sometimes referred to as "bring your own device" (BYOD). When a device is used in a BYOD environment, a company may need to manage the employee's device to secure the contents and apps before allowing a device to be used for work. When a device is managed by the company, even though device owner is the employee, the employee may lose at least some control of the device and privacy (e.g., app and usage can be reported to company's management server). In certain cases, complexity is introduced when the employee's device is shared with family members and/or when the employee works for multiple companies. For example, an employee and/or device may have to change back and forth between each of multiple companies' management servers. In some scenarios, the increased complexity may make the user less inclined to use their device in a BYOD environment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to allow multiple device management servers to participate in managing a mobile device, such as a phone or tablet, are disclosed. In some embodiments, the techniques disclosed herein may be used to build, at a device level, a management proxy agent on top of a device mobile device management (MDM) agent. The management proxy agent on the device may be configured to allow and manage the participation of multiple MDM management entities, such as third party MDM servers and/or MDM-enable application servers, in the management of apps and content on the device. In some embodiments, a trusted cloud-based management proxy server or "broker" may be used to manage the device MDM agent on behalf of one or more management servers, such as third party MDM servers and/or MDM-enable application servers.

Figure 1:
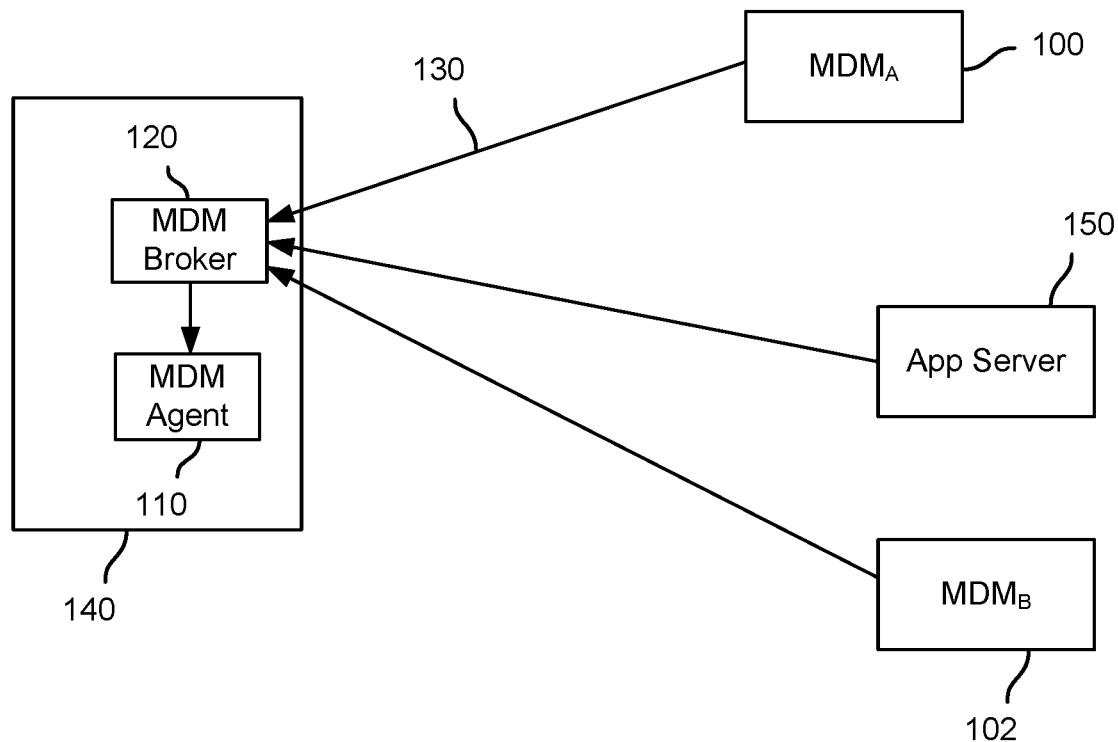
FIG. 1 is a block diagram illustrating an embodiment of a mobile device management system in which a management proxy agent (broker) on a mobile device manages participation by multiple servers in management of the device.

FIG. 1 is a block diagram illustrating an embodiment of a mobile device management system in which a management proxy agent (broker) on a mobile device manages participation by multiple servers in management of the device. In the example shown, MDM broker 120, sometimes referred to herein as a management proxy agent or management broker, comprises software code, such as a mobile app, running on mobile device 140. The on device MDM broker 120 in this example provides MDM control via a native or other MDM agent 110 on the device. In various embodiments, device MDM agent 110 is configured to trust and take direction from MDM broker 120. In various embodiments, MDM broker 120 includes software code configured to display an interactive user interface, not shown in FIG. 1, to enable a user of device 140 to configure MDM broker 120 to allow one or more remote MDM entities, such as third party MDM servers 100 and 102 and/or application server 150, in this example, to participate in the management of device 140.

While in various embodiments described herein the term "mobile device management" or "MDM" may be used to refer to a management proxy such as MDM broker 120 in the example shown in FIG. 1, techniques disclosed herein may be applied in the context of any management agent or node, e.g., a management server.

According to various embodiments, a device management server 100 (e.g., MDM Server) may be associated with, for example, an enterprise, consumer, and/or other entity. For example, each of multiple companies can have a different type of MDM server 100. A BYOD device 140 (e.g., mobile phone, tablet, iPhone, iPad, etc.) may include a device management agent 110 (e.g., MDM agent). Depending, for example, on an operating system (OS) associated with the device 140, the agent 110 may be embedded to the OS (e.g., iOS, Windows phone), may be an app with device management permission (e.g., Android), and/or may otherwise be associated with the device 140. In some embodiments, a device 140 may include a management proxy agent (broker) 120. For example, a device 140 may be associated with multiple MDM servers 100, and a management proxy agent (broker) 120 may, for example, receive management commands from each MDM server 100 and pass commands to a device management agent 110 (e.g., after authentication and authorization). Information may be passed from the device management agent 110 to a device management server 100 via the management proxy agent (broker) 120 (e.g., after required filtering for privacy and/or other controls). A management proxy protocol 130 may allow device management server 100 to communicate with management proxy agent (broker) 120. An application server 150 may send device management commands and/or other information to the BYOD device 140.

In various embodiments, a device owner (e.g., an employee) may configure the management proxy agent (broker) 120 on a BYOD device 140 to be managed by multiple device management servers 100, application servers 150, and/or other nodes. A management proxy agent (broker) 120 may maintain configurations for a list of trusted device management servers 100, authorize device management functions/information, and/or perform other operations. In various embodiments, during registration, a device owner may select allowed permissions for device management server 100, application server 150, and/or other nodes. Permissions may include, for example, allow lock, disallow wipe, allow password policy, allow password compliance, disallow app inventory and/or other permissions. In various embodiments, when a device management server 100 requires device information, the management proxy agent (broker) 120 may filter the information and send it to the device management server 100. In some cases, depending on the information disclosure policy, the management proxy agent (broker) 120 may report filtered information so the device management server 100 may, for example, decide what to do for missing information. In various embodiments, application server 150 can interact with management proxy agent (broker) 120 to manage a BYOD device 140.

Figure 2:
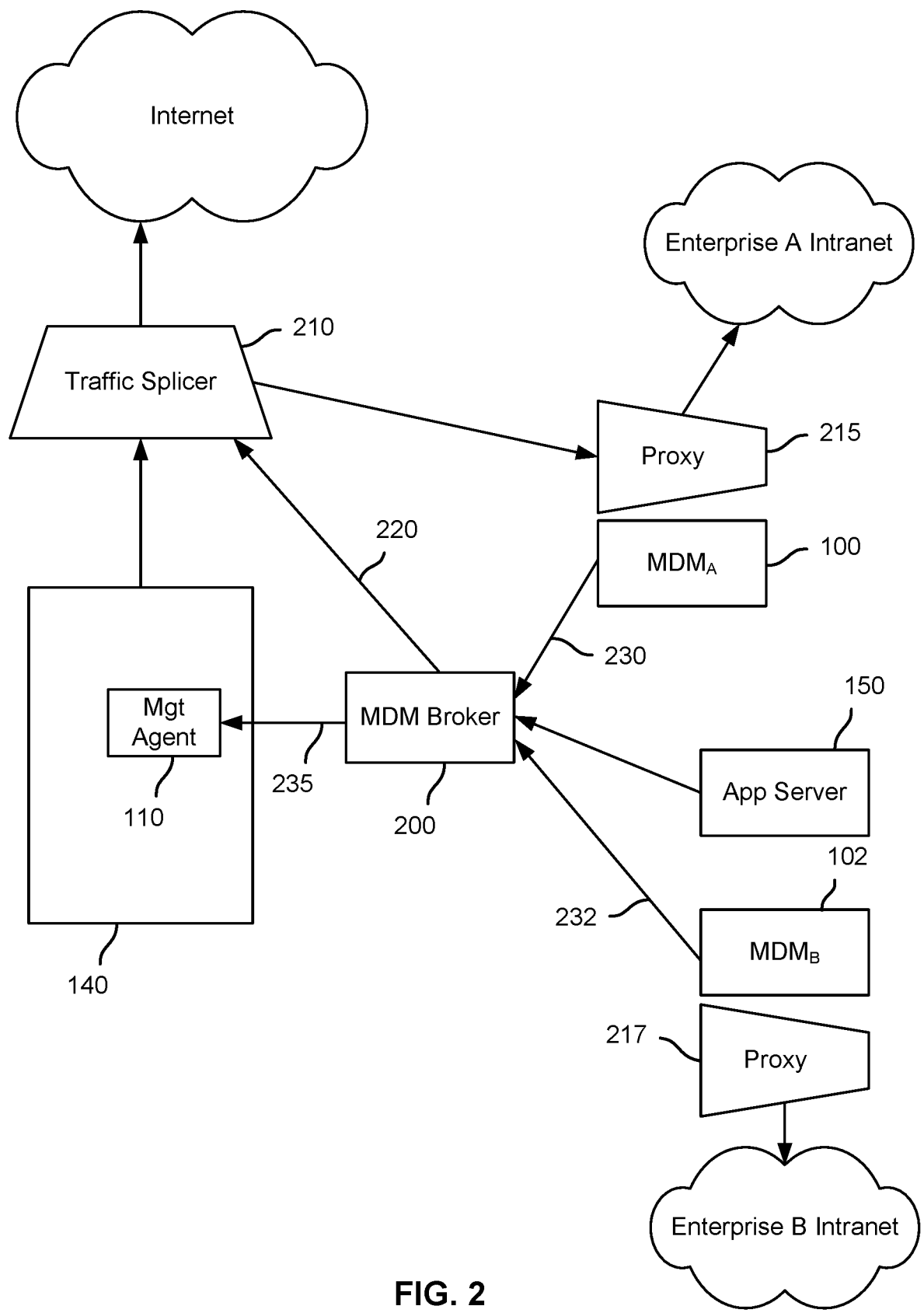
FIG. 2 is a block diagram illustrating an embodiment of a mobile device management system in which an MDM broker external to a mobile device manages participation by multiple servers in management of the device.

FIG. 2 is a block diagram illustrating an embodiment of a mobile device management system in which an MDM broker external to a mobile device manages participation by multiple servers in management of the device. In the example shown, an MDM proxy (broker) 200 or other management server provided at a management node external to one or more managed mobile devices, such as mobile device 140, manages participation by multiple servers in management of the devices for which the MDM proxy (broker) 200 is configured to manage.

In various embodiments, a device management server, such as MDM servers 100 and 102 in FIG. 2, may be associated with an enterprise, consumer, and/or other entity. For example, each of one or more companies may have a different type of MDM server, e.g., MDM server 100 may be a first type of MDM server, from a first third party MDM provider, and MDM server 102 may be a second type of MDM server, from a different third party MDM provider. In the example shown, a device management agent 110 (e.g., MDM Agent) is installed on the BYOD device 140. In various embodiments, a type of management agent 110 may, for example, depend on the device OS. The agent 110 can, for example, be embedded to the OS (e.g., iOS, Windows phone), an application with device management permission (e.g., Android), and/or another type of management agent 110.

In various embodiments, an application server such as application server 150 may send device management commands to BYOD Device 140 via MDM proxy 200. MDM proxy 200 may be configured, for example by a user of Device 140 to delegate/grant to application server 150 a specific scope of management authority and/or privileges with respect to Device 140.

In some embodiments, MDM proxy 200 may receive management commands from device management servers such as MDM server 100 and/or MDM server 102. The cloud MDM proxy 200 may, for example, pass the commands to the device management agent 110 (e.g., after authentication and authorization). The cloud MDM proxy 200 may also perform privacy filtering and/or information encryption before sending device information from the device management agent 110 to device management server 100.

In various embodiments, a cloud traffic splicer 210 may include a proxy server that connects the device cellular and/or Wi-Fi traffic to the Internet.

According to some embodiments, a traffic proxy 215, 217 may, for example, be associated with a device management server 100 (e.g., an enterprise, consumer, and/or other server). For example, each of multiple companies may have a different proxy server (e.g., different type of proxy server). In the example shown in FIG. 2, the traffic proxy server 215 may connect traffic to enterprise A's intranet, associated with MDM server 100, while the traffic proxy 217 may connect traffic to enterprise B's intranet, associated with MDM server 102. In some cases, an MDM server may include and/or server as a traffic proxy for an enterprise or other intranet.

In various embodiments, a cloud MDM proxy 200 may manage (220) a cloud traffic splicer 210. A management proxy protocol 230, 232 may allow a device management server 100, 102 to communicate with the cloud MDM proxy 200. Device management protocol 235 may facilitate communications between the device management agent 110 and cloud MDM proxy 200.

In various embodiments, a device owner (e.g., employee) may configure a device management agent 110 on a BYOD device 140 to be managed by a cloud MDM proxy 200. The cloud MDM proxy 200 may, for example, maintain configurations for a list of trusted device management servers 100, application servers 150, and/or other nodes. The cloud MDM proxy 200 may authorize device management functions/information, and/or perform other operations. In various embodiments, during registration a device owner may select allowed permissions for device management servers, such as MDM servers 100, 102 and/or application servers, such as application server 150, and/or other nodes. In the event a device management server 100, 102 requires device information, the cloud MDM proxy 200 may filter the information and send it to the device management server 100, 102. In various embodiments, depending on an information disclosure policy, a cloud MDM proxy 200 may report filtered information, so the device management server 100 can decide what to do for missing information.

According to some embodiments, a device owner may configure a BYOD device 140 to use the cloud traffic splicer 210 for network access (e.g., cellular, Wi-Fi, and/or other Internet access). In various embodiments, the cloud traffic splicer 210 may be configured by the cloud MDM proxy 200. The cloud MDM proxy 200 may configure the cloud traffic splicer 210 with a policy to splice traffic to the respective traffic proxy 215, 217 of one or more enterprise or other private domains; the Internet; and/or other destination, e.g., depending on the nature/content of the communication, the originating app, etc. In various embodiments, a cloud traffic splicer may be configured to meter data traffic usage associated with accessing the company intranet, and the company may reimburse the employee for enterprise data usage, e.g., to promote the employee staying with the company.

According to various embodiments, an enterprise device management server 100, application server 150, and/or other node may send push messaging to BYOD device 140 using, for example, a cloud MDM proxy 200 provided application programming interface (API). In various embodiments, push messages can be used to wake up a BYOD Device 140 (e.g., to get latest device status). For example, push messages can be delivered to a device using a device OS push message framework (e.g., iOS push notification, Android's Google Cloud Messaging, Windows's Windows Push Messaging, etc.). In another example, push messages may be delivered using customer push messaging (e.g., short messaging service (SMS) text messages, custom messaging delivery mechanism, etc.).

In various embodiments, all or part of the mobile device management described herein, in particular the management required to keep one enterprise's app-related content and activity separate from that of another enterprise and/or the personal app content and activity reserved to the user personally, may be provided at least in part by using app-level management functionality of the mobile operating system, such as iOS7 managed apps or the "Android for Work" feature of the Android operating system, and/or by a third party management infrastructure provided on the device to manage apps individually, such as MobileIron's® AppConnect™ technology. For example, MobileIron's® AppConnect™ technology may be used to associate the applications of enterprise A with one secure bus accessible by those apps and a second, separate secure bus associated with apps of enterprise B. Apps within each respective set of apps (enterprise A or B) would have secure access to content and information shared via the AppConnect™ bus associated with that set of apps only. In some embodiments, an MDM broker, such as MDM broker 120 in the example shown in FIG. 1 or MDM broker 200 in FIG. 2, may have a level of privilege with respect to the mobile device and its MDM architecture to manage and facilitate the provisioning of the secure app communication buses.

While the example described above in connection with FIGS. 1 and 2 involve providing brokered management on behalf of two or more enterprises and/or application servers, in some embodiments techniques disclosed herein may be used by a device owner/user to configure similar management of a personal domain of information, content, and/or apps on the mobile device. For example, a cloud-based personal MDM or other management service may be provided, and may participate in the management of the personal content on the device in the same way that MDM servers such as MDM servers 100, 102 in the examples shown in FIGS. 1 and 2 participate in management of their respective content and apps on the mobile device. For example, in some embodiments, a user may use such a service to manage personal content on the device, providing access to MDM and/or other management features, such as the ability to selective wipe (remove) personal data from the device, the ability to provide for encryption of content as store on the device or in transit, etc. In some embodiments, multiple personal/user domains may be provided, e.g., to enable an owner to manage his/her content independently of that of another user, such as a spouse, co-worker, child, etc.

Figure 3:
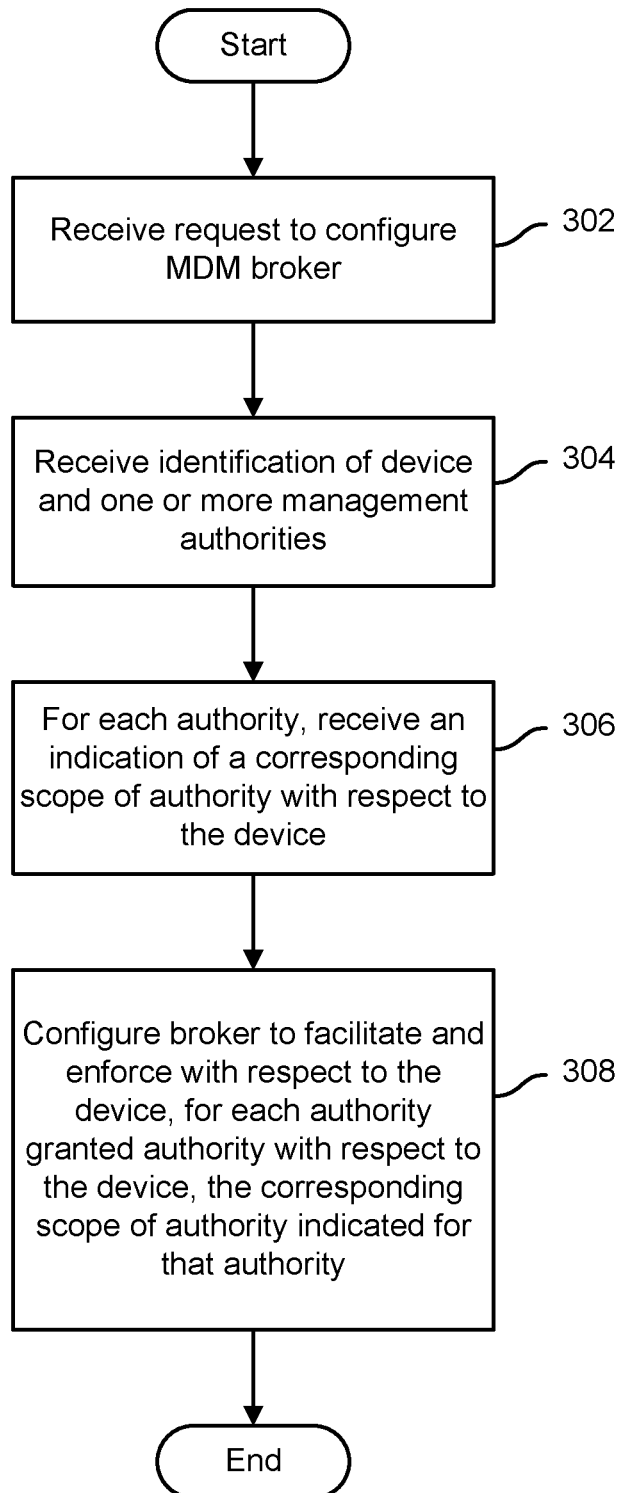
FIG. 3 is a flow chart illustrating an embodiment of a process to configure an MDM broker to manage participation by multiple servers in management of a mobile device.

FIG. 3 is a flow chart illustrating an embodiment of a process to configure an MDM broker to manage participation by multiple servers in management of a mobile device. In various embodiments, the process of FIG. 3 may be performed by and/or with respect to an MDM proxy agent/broker installed on a mobile device, such as MDM proxy agent/broker 120 of FIG. 1, or an external MDM proxy/broker, such as MDM broker 200 of FIG. 2. In the example shown, a request to configure the MDM broker is received (302). For example, a device owner and/or administrative user may have accessed a web-based or other administrative user interface. An identification of a mobile device and one or more management authorities (e.g., MDM server 100, MDM server 102, app server 150, etc.) is received (304). For each authority, an indication of a corresponding scope of authority with respect to the device, e.g., a set of management rights and/or privileges, is received (306). For example, an administrative user interface may enable a device owner to indicate a scope of authority for each of the management authorities identified by the user. The MDM broker (e.g., MDM broker 120 or MDM broker 200) is configured to facilitate and enforce with respect to the device, for each authority to which authority is granted, the corresponding scope of authority defined by the user (308). For example, the MDM broker may be configured to perform filtering, as required, to ensure a management authority does not receive information to which the owner has not granted that authority access.

Figure 4:
FIG. 4 is a block diagram illustrating an example of a data structure used to store configuration and policy information in an embodiment of a mobile device management (MDM) system.

FIG. 4 is a block diagram illustrating an example of a data structure used to store configuration and policy information in an embodiment of a mobile device management (MDM) system. In some embodiments, a user interface may be provided to enable a user, such as a device owner, to define policies and settings such as those in the example shown in FIG. 4.

In various embodiments, by configuring a cloud MDM proxy, e.g., MDM proxy/broker 200 (or device level MDM proxy agent, such as MDM proxy agent 120) and a cloud traffic splicer, such as traffic splicer 210, a device owner can delegate management to one or more enterprise MDM servers and/or app servers. For example, a user can delegate specific management features selected by the user, and can specify which data can be managed by which enterprise MDM server and/or app server.

According to some embodiments, an enterprise device management server and/or app server can interact with a cloud MDM proxy (or device level MDM proxy agent) to manage a device and/or get device information. In various embodiments, an enterprise MDM server and/or app server may exercise control over apps and/or data on a managed device and/or obtain information from and/or about the device, via the MDM proxy, to an extent defined by an owner of the device, e.g., via a web-based or other user interface.

In the example shown in FIG. 4, for example, for the device "1234", the owner has authorized MDM servers associated with "Enterprise 1" and "Enterprise 2", respectively, to define policies and/or adjust settings on the device with respect to device interactions with Microsoft Exchange® servers of those enterprises. For example, such an authority may enable each of the enterprises to establish on the device 1234, via the MDM proxy 200, an enterprise-specific email profile, subject to the control and ownership of the enterprise. Each enterprise could then control its own enterprise content, e.g., by removing the profile and associated content data through a command/request sent to the MDM proxy 200. In some embodiments, the MDM proxy 200 would check a data structure such as table 400 of FIG. 4, determined based on the corresponding entry in table 400 that the enterprise MDM server has been grant authority to take compliance actions with respect to email profiles associated with that enterprise MDM server, and would relay or otherwise forward to the device 1234 a command that would result in removal of the profile and associated content, in various embodiments without affecting profiles and/or content associated with other entities and/or the owner personally.

Referring further to the example shown in FIG. 4, the same two enterprises have been granted authority with respect to apps installed on the device 1234, but in this example the user (e.g., device owner) has granted slightly different privileges to the enterprises. Specifically, in this example, the user has granted to "Enterprise 1" the right to install apps, and to remove or obtain an inventory of only those apps that were installed by that enterprise. By comparison, in this example, "Enterprise 2" has been granted the authority to install, remove, or obtain an inventory of all apps on the device. In this example, the second enterprise may have a policy or requirement that the employee provide this higher level of authority of apps on the device 1234, whereas the first enterprise may require only that it be given control over apps that are installed by that enterprise. In other examples, different requirements may exist, and a user/owner of a device may allocate and/or restrict authority at various levels of granularity and specificity.

In some embodiments, an on-device or cloud-based MDM broker, such as MDM broker 120 of FIG. 1 or MDM broker 200 of FIG. 2, may facilitate the exercise by MDM servers and/or application servers of authority that has been granted to them, as in the example shown in FIG. 4, subject to the restrictions and qualifications specified by the user/owner.

In the example shown in FIG. 4, a limited management authority has been granted to "App Server 1", e.g., app server 150 in the example shown in FIG. 1. In various embodiments, a limited MDM functionality may be built into an application on the app server side, to enable application-related control over the device to be exercised. For example, an MDM module or plug in may be provided, or a software development kit (SDK) or other code provided and included in the application code running at the app server, and/or the application developer may write code to invoke an application programming interface (API) of the MDM broker, to enable MDM functionality to be incorporated and/or provided.

In the example shown in FIG. 4, "App Server 1" has been granted authority with respect to "device lock down", but subject to a "filter" that limits the application to being able to set a "camera capture lock" to prevent screen capture. For example, an application (e.g., Snapchat™) may wish to provide a guarantee that the privacy of communications and/or the ephemeral nature of communications will not be compromised through device screen capture, and could require users to grant an authority such as the one shown in FIG. 4 as a condition to use the app. In various embodiments, an application server may use such a grant of authority, e.g., to send a command to the device, via the MDM broker, at the start of an app server facilitated connection or session.

A cloud traffic splicer may, in various embodiments, splice device data traffic to the Internet, enterprise backend, and/or relaying proxy servers, depending on how the splicer has been configured. In some embodiments, the splicer may be configured to secure traffic (e.g., filtering, encryption, etc.). In the example shown in FIG. 4, a first enterprise ("Enterprise 1") has been granted authority to configure a traffic splicer with which the device 1234 is associated to splice traffic associated with Enterprise 1, the scope of authority in this example being defined as traffic associated with the "ent1.com" domain. A second enterprise ("Enterprise 2") has been granted authority to configure the traffic splicer with respect to traffic associated IP addresses in the range indicated, which may correspond to the enterprise's internal network, e.g., an intranet.

In various embodiments, the grants of authority shown in FIG. 4 may enable the corresponding MDM servers to configure the traffic splicer, via interactions with the MDM broker, to splice traffic associated with each respective enterprise to a proxy or other node associated with that enterprise. For example, referring to FIG. 2, MDM servers 100, 102 may interact via protocols 230, 232 with MDM broker 200 to cause the splicer 210 to be configured via communications 220 to route each enterprise's traffic to the destination specified by that enterprise, e.g., to proxy 215 is the case of MDM server 100 or to proxy 217 in the case of MDM server 102. In some embodiments, the MDM/application server or another node may serve as the traffic proxy.

Figure 5:
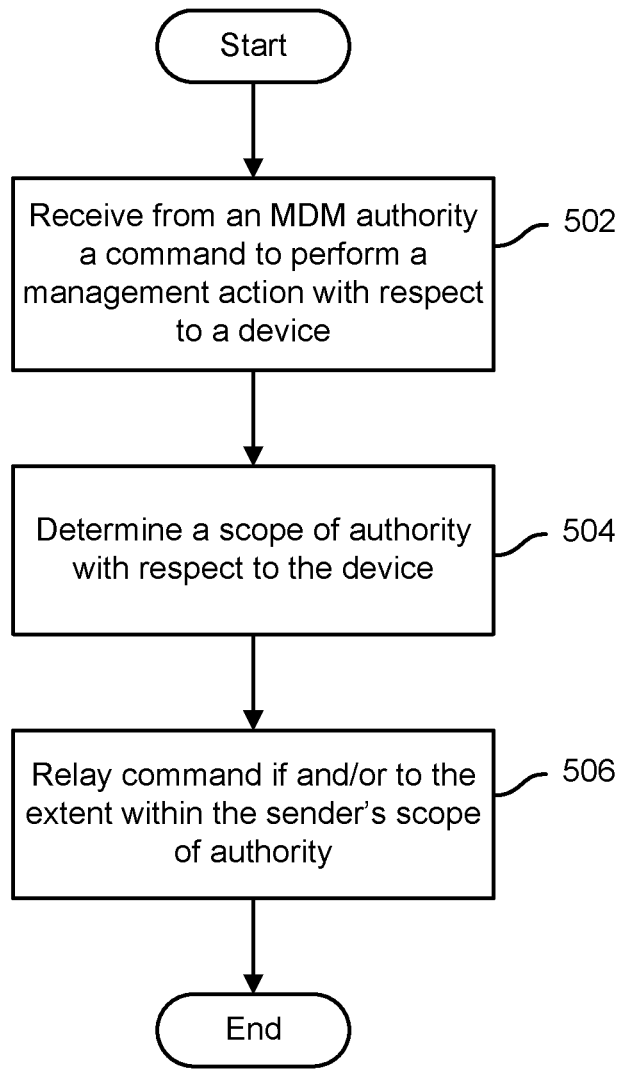
FIG. 5 is a flow chart illustrating an embodiment of a process to enforce an MDM compliance action within a scope of authority.

FIG. 5 is a flow chart illustrating an embodiment of a process to enforce an MDM compliance action within a scope of authority. In various embodiments, the process of FIG. 5 may be implemented by an MDM broker, such as MDM proxy agent/broker 120 of FIG. 1 or MDM proxy/broker 200 of FIG. 2. In the example shown, a command (or request) to perform a management action with respect to a managed mobile device is received from an MDM authority, e.g., MDM server 100 or 102 of FIGS. 1 and 2 or application server 150 of FIGS. 1 and 2 (502). A scope of authority with respect to the device, as relevant to the command/request, is determined (504). For example, a look up may be performed in a data structure such as table 4 of FIG. 4, to determine the relevant scope of authority that has been granted to the MDM authority that sent the command/request. The command/request is relayed to the device, if and/or to the extent indicated by the applicable scope of authority (506). For example, referring to FIG. 4, a request of an app inventory received from an MDM server associated with "Enterprise 1" may be processed by obtaining an app inventory from the device and filtering out any apps that were not installed by that enterprise. Similarly, a "device lock down" command received from "App Server 1" may be modified to be a "camera capture lock" command prior to being sent to the device (or, in the case of an on-device MDM broker, prior to sending the command to the native or other MDM agent).

In some embodiments, enterprise applications and data may remain stored on a device while the device, or at least the enterprise apps and content thereon, is/are managed by the enterprise. When, for example, a user is no longer a trusted enterprise user, an enterprise device management system may be notified, receive confirmation of which enterprise applications are present on the device, and may remove data (e.g., from enterprise applications) within a scope of authority held by the enterprise and/or its MDM server.

Figure 6:
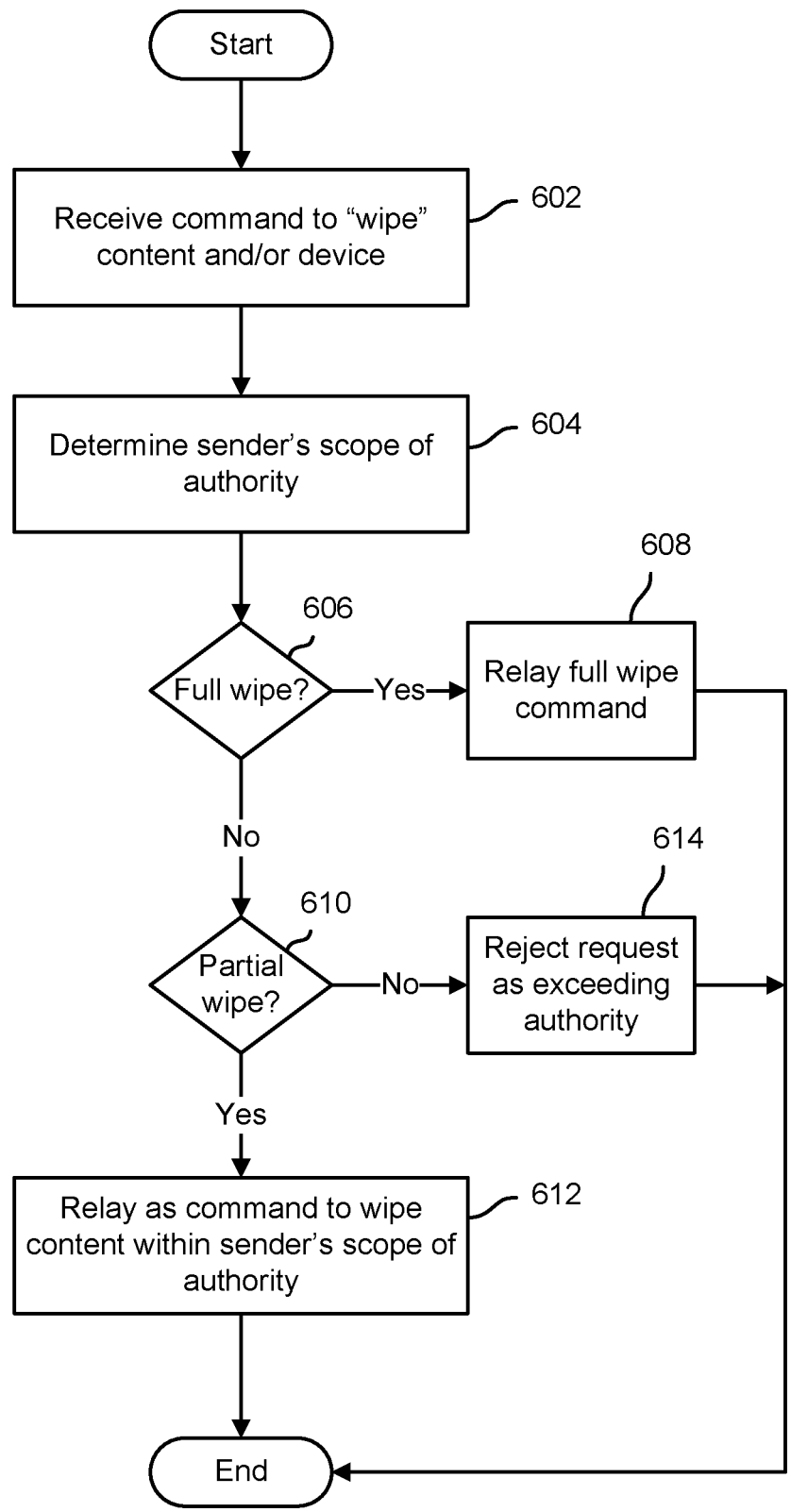
FIG. 6 is a flow chart illustrating an embodiment of a process to allow a management authority to remove data from a mobile device within a scope of its authority.

FIG. 6 is a flow chart illustrating an embodiment of a process to allow a management authority to remove data from a mobile device within a scope of its authority. In various embodiments, the process of FIG. 6 may be implemented by an MDM broker, such as MDM proxy agent/broker 120 of FIG. 1 or MDM proxy/broker 200 of FIG. 2. In the example shown, a command to "wipe" (i.e., remove) specific content on a device, and/or to wipe the device itself (e.g., reset to factory or other state having no user data), is received (602). A scope of authority of an MDM authority (e.g., MDM server, application server) from which the command was received is determined (604). For example, in some embodiments, the scope of authority to remove data may be determined by performing a look up in a data structure such as table 4 of FIG. 4. If the command was a full wipe command and the sender has been granted the authority to initiate such a wipe (606), then the full (device) wipe command is forwarded to the device (608), e.g., by sending it from the MDM broker (120, 200) to the device MDM agent (110). If the command is for a selective wipe of content and the sender has been granted at least some scope of authority to initiate removal of data (610) (or, in some embodiments, if the sender sent a full/device wipe command but has been granted only selective wipe authority), the command is relayed, if needed in modified form, as a command to wipe content that the originator of the command has been granted the authority to remove from the device (612). For example, referring to FIG. 4, a command from "Enterprise 1" to remove all managed apps may be translated at the MDM broker to be a command to remove a list of specific apps that were installed by and/or otherwise made subject to management by "Enterprise 1". If the originator of the request is determined not to have been authorized to remove even partial data from the device (610), the request is rejected as exceeding the originator's authority with respect to the device (614).

Figure 7:
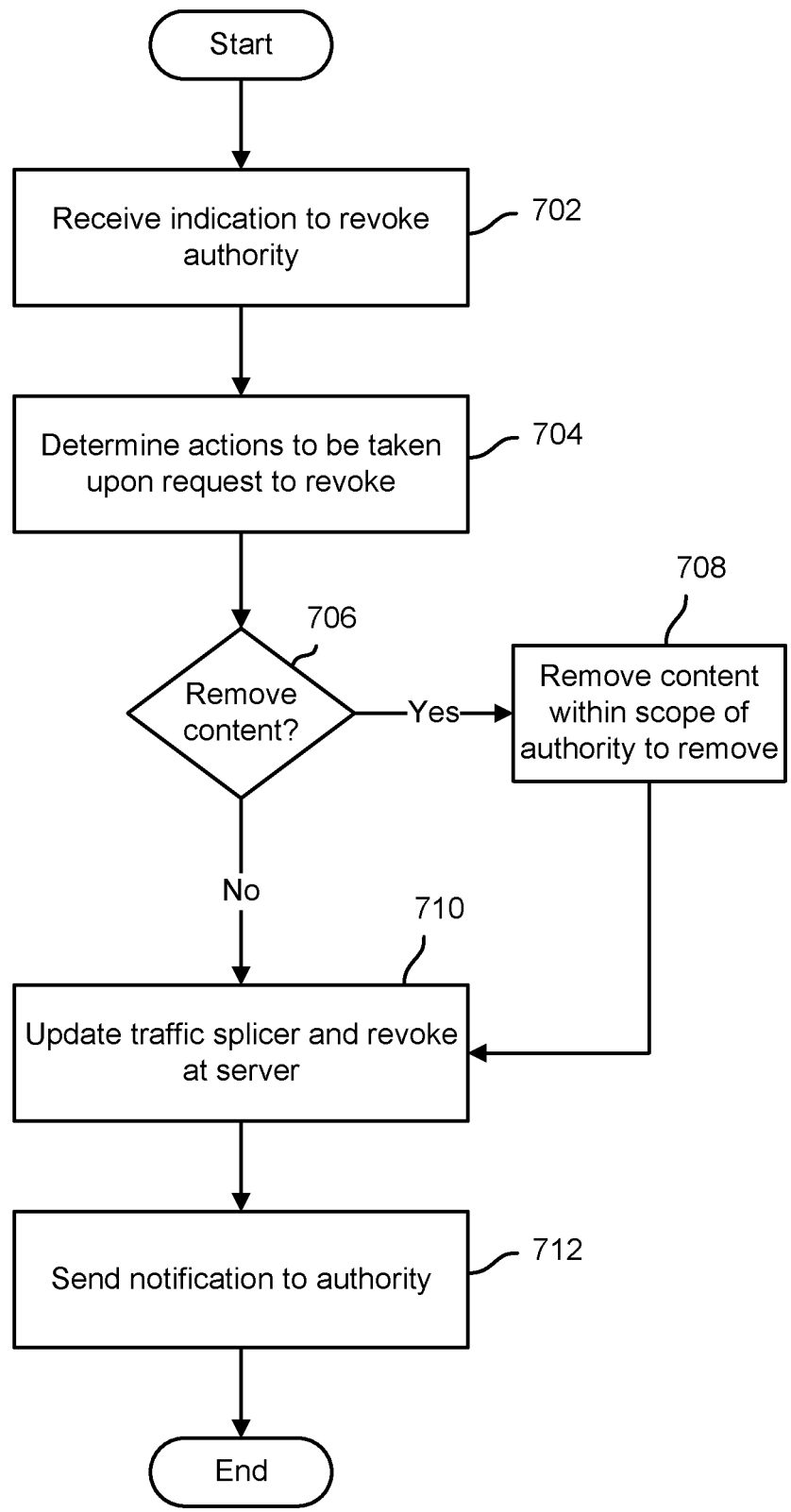
FIG. 7 is a flow chart illustrating an embodiment of a process to respond to a request to revoke a previously-granted MDM authority.

FIG. 7 is a flow chart illustrating an embodiment of a process to respond to a request to revoke a previously-granted MDM authority. In various embodiments, the process of FIG. 7 may be performed by an MDM broker, such as MDM proxy agent/broker 120 of FIG. 1 or MDM proxy/broker 200 of FIG. 2, e.g., in response to an attempt by a device user/owner to revoke a previously-granted grant of management authority. In the example shown, an indication is received to revoke a grant of authority (702). For example, a device user/owner may use a web-based or other administrative user interface to attempt to modify a previously-granted authority, such as those shown in FIG. 4. In the example shown, a determination is made as to whether there are any actions the MDM broker is configured to perform automatically prior to and/or in the event of a revocation of management authority by the user (704). For example, in some embodiments, the MDM broker may be configured, e.g., by an MDM authority to which authority has been granted and/or by a user/owner of the device, to remove content (706) associated with the MDM authority, automatically and without further human interaction. If so configured (706), content associated with the MDM authority (e.g., MDM server, application server) the management authority of which is being revoked may be removed, e.g., within a previously-define scope of removal authority (708). If the MDM broker is not configured and/or authorized to remove any content (706), or once such removal has been completed (706, 708), a traffic splicer (if configured to splice traffic to the enterprise) is updated to no longer splice traffic to that enterprise, and the MDM broker is updated to reflect revocation of the previously-granted authority (710), e.g., any entry in a data structure such as table 400 of FIG. 4 may be marked as "revoked" or deleted. A notification that the management authority has been revoked is sent to the MDM authority whose authority has been revoked (e.g., enterprise MDM server, application server) (712).

Techniques disclosed herein may be used, in various embodiments, to enable enterprises, application developers/providers, and other management authorities to be granted management authority with respect to enterprise/other content stored on and/or associated with a mobile device not owned or fully subject to the control of the enterprise/other entity, within a scope of authority defined and granted by an owner/user of the device. In various embodiments, a degree of management authority may be exercised by content owners without compromising the privacy of an owner/user of the device, with respect to personal data and use, and without compromising the security of data owned by others, such as other enterprises.

In various embodiment, techniques disclosed herein may be used to enable an Enterprise A to manage its own content without being able to see anything beyond what has been granted for it to see. Similarly, Enterprise B can manage its own content but cannot see anything other than what has been granted to it. In various embodiments, an end user of a mobile device can grant management rights to other entities, such as Enterprise A and Enterprise B in the foregoing example, while preserving the end user's ability to see everything on the device and to manage the rest of the device, i.e., anything not subject to a grant made by the user to others as disclosed herein. In various embodiments, techniques disclosed herein may mitigate privacy concerns that otherwise might have made such an end user less inclined to use his/her personal mobile device for work purposes for an enterprise that requires that the enterprise maintain control over enterprise data, even when it resides on a personal mobile device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of managing a mobile device, comprising:
   receiving from a mobile device management (MDM) authority a request to perform a management action with respect to the mobile device;
   determining a scope of authority of the MDM authority with respect to the mobile device, wherein determining the scope of authority comprises performing a look up in a table or other data structure in which data reflecting grants of authority to one or more MDM authorities are stored, wherein performing the look up in the table or other data structure includes identifying a scope of authority that has been granted to the MDM authority;
   in response to determining that a scope of authority needed to perform the requested management action does not match the scope of authority that has been granted to the MDM authority that is specified in the table or other data structure for the MDM authority, determining a different management action that is specified in the table or other data structure for the MDM authority, wherein the determined different management action is specified for the MDM authority in the table or other data structure;

modifying a scope of the requested management action to match the scope of authority that has been granted to the MDM authority by translating the requested management action to be the different management action that is specified in the table or other data structure for the MDM authority; and causing the different management action that is within the scope of authority that has been granted to the MDM to be performed with respect to the mobile device.

2. The method of claim 1, wherein a request is received at a management broker configured to facilitate management of the mobile device by the one or more MDM authorities, each within a corresponding scope of authority that has been granted to that MDM authority.

3. The method of claim 2, wherein the management broker comprises an app or other software entity installed on the mobile device.

4. The method of claim 2, wherein the management broker is configured to manage the mobile device on behalf of the one or more MDM authorities at least in part via interactions with an MDM agent installed on the mobile device.

5. The method of claim 4, wherein the MDM agent comprises a native MDM agent associated with an operating system of the mobile device.

6. The method of claim 2, wherein the management broker comprises a cloud-based management proxy or other server.

7. The method of claim 1, wherein the scope of authority of a second MDM authority is defined by an owner or other user of the mobile device.

8. The method of claim 7, wherein the MDM authority comprises a personal domain of authority reserved to the owner or other user of the mobile device and the scope of authority of the second MDM authority represents a scope of authority reserved by the owner or other user to him/herself personally.

9. The method of claim 1, wherein causing the different management action to be performed with respect to the mobile device based at least in part on the determined scope of authority of the MDM authority with respect to the mobile device includes causing the different management action to be performed to an extent indicated by the scope of authority that has been granted to the MDM authority.

10. The method of claim 1, wherein causing the different management action to be performed with respect to the mobile device based at least in part on the determined scope of authority of the MDM authority with respect to the mobile device includes causing the different management action to be performed with respect to a subset of data on the mobile device as indicated by the scope of authority that has been granted to the MDM authority.

11. The method of claim 1, wherein the mobile device is associated with a plurality of MDM authorities, wherein each of the plurality of MDM authorities has a corresponding scope of authority.

12. The method of claim 1, wherein causing the different management action to be performed with respect to the mobile device based at least in part on the scope of authority that has been granted to the MDM authority with respect to the mobile device includes filtering a result data provided by the mobile device in response to the request to filter out data that is not within the scope of authority of the MDM authority.

13. A system, comprising:
a storage device; and
a processor coupled to the storage device and configured to:
receive from a mobile device management (MDM) authority a request to perform a management action with respect to a mobile device;
determine a scope of authority of the MDM authority with respect to the mobile device, wherein determining the scope of authority comprises performing a look up in a table or other data structure in which data reflecting grants of authority to one or more MDM authorities are stored, wherein performing the look up in the table or other data structure includes identifying a scope of authority that has been granted to the MDM authority;
in response to a determination that a scope of authority needed to perform the requested management action does not match the scope of authority that has been granted to the MDM authority that is specified in the table or other data structure for the MDM authority determine a different management action that is specified in the table or other data structure for the MDM authority, wherein the determined different management action is specified for the MDM authority in the table or other data structure;
modify a scope of the requested management action to match the determined scope of authority by translating the requested management action to be the different management action that is specified in the table or other data structure for the MDM authority; and
cause the different management action that is within the scope of authority that has been granted to the MDM to be performed with respect to the mobile device.

14. The system of claim 13, wherein the request is received at a management broker configured to facilitate management of the mobile device by one or more MDM authorities, each within a corresponding scope of authority that has been granted to that MDM authority.

15. The system of claim 14, wherein the management broker comprises an app or other software entity installed on the mobile device.

16. The system of claim 14, wherein the management broker is configured to manage the mobile device on behalf of the one or more MDM authorities at least in part via interactions with an MDM agent installed on the mobile device.

17. The system of claim 14, wherein the scope of authority of a second MDM authority is defined by an owner or other user of the mobile device.

18. The system of claim 14, wherein causing the different management action to be performed with respect to the mobile device based at least in part on the determined scope of authority of the MDM authority with respect to the mobile device includes causing the different management action to be performed with respect to a subset of data on the mobile device as indicated by the scope of authority that has been granted to the MDM authority.

19. A computer program product to manage a mobile device, the computer program product being embodied in a non-transitory computer readable storage medium and comprising computer instructions for:

receiving from a mobile device management (MDM) authority a request to perform a management action with respect to the mobile device;

determining a scope of authority of a management the MDM authority with respect to the mobile device, wherein determining the scope of authority comprises performing a look up in a table or other data structure in which data reflecting grants of authority to one or more MDM authorities are stored, wherein performing the look up in the table or other data structure includes identifying a scope of authority that has been granted to the MDM authority;

in response to determining that a scope of authority needed to perform the requested management action does not match the scope of authority that has been granted to the MDM authority that is specified in the table or other data structure for the MDM authority, determining a different management action that is specified in the table or other data structure for the MDM authority, wherein the determined different management action is specified for the MDM authority in the table or other data structure;

modifying a scope of the requested management action to match the scope of authority that has been granted to the MDM authority by translating the requested management action to be the different management action that is specified in the table or other data structure for the MDM authority; and causing the different management action that is within the scope of authority that has been granted to the MDM to be performed with respect to the mobile device.

\* \* \* \* \*

UNITED STATES PATENT AND TRADEMARK OFFICE
CERTIFICATE OF CORRECTION

| | | |
|---|---|---|
| PATENT NO. | : 11,487,889 B2 | |
| APPLICATION NO. | : 16/229623 | |
| DATED | : November 1, 2022 | |
| INVENTOR(S) | : Suresh Kumar Batchu and Mansu Kim | |

It is certified that error appears in the above-identified patent and that said Letters Patent is hereby corrected as shown below:

In the Claims

In Column 12, Line(s) 25, Claim 13, after "MDM authority", insert --,--.

Signed and Sealed this
Fifth Day of September, 2023

*Katherine Kelly Vidal*
Katherine Kelly Vidal
*Director of the United States Patent and Trademark Office*